March 28, 1933. H. A. HADLEY 1,903,110
COIN CONTROLLED WEIGHING MACHINE
Filed Dec. 30, 1927 2 Sheets-Sheet 1

INVENTOR
HARLAN A. HADLEY
BY
ATTORNEY

March 28, 1933.   H. A. HADLEY   1,903,110
COIN CONTROLLED WEIGHING MACHINE
Filed Dec. 30, 1927   2 Sheets-Sheet 2
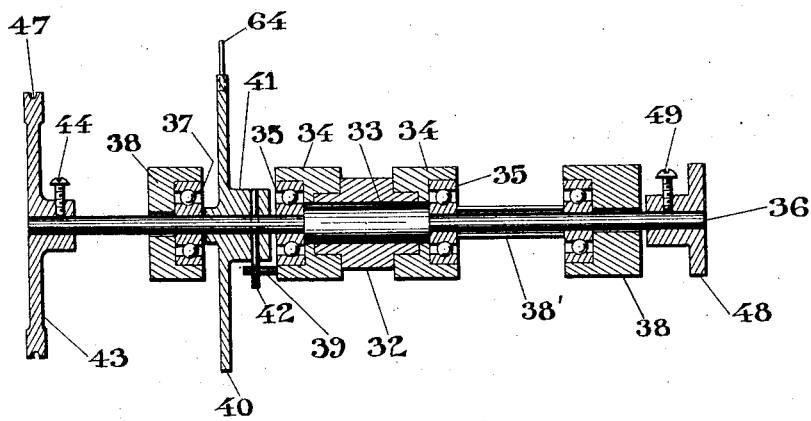
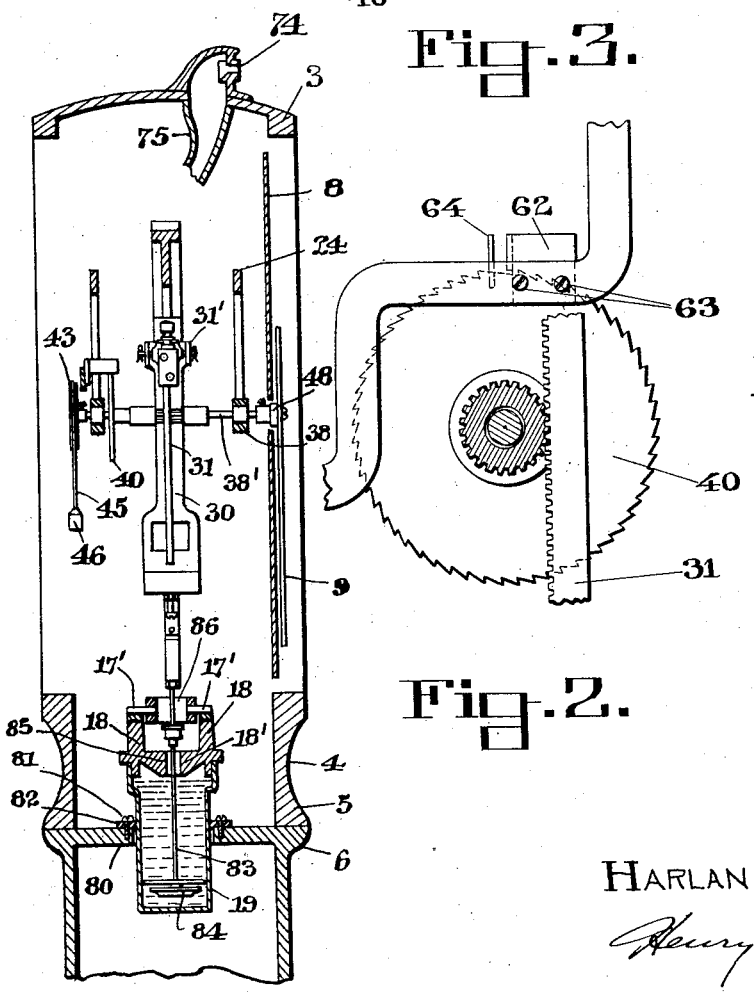
INVENTOR
HARLAN A. HADLEY
BY
ATTORNEY Patented Mar. 28, 1933

1,903,110

UNITED STATES PATENT OFFICE

HARLAN A. HADLEY, OF ST. JOHNSBURY, VERMONT, ASSIGNOR TO E. AND T. FAIRBANKS AND COMPANY, A CORPORATION OF VERMONT

COIN-CONTROLLED WEIGHING MACHINE

Application filed December 30, 1927. Serial No. 243,576.

This invention relates to improvements in coin-controlled weighing machines and more particularly to improvements in the coin-controlled mechanism whereby a construction is obtained which is simple, reliable and efficient. Other features of the construction disclosed in the accompanying drawings are embodied in separate copending applications, Serial Number 184,310, scale bearings, Harlan A. Hadley, filed April 16, 1927 and Serial Number 187,881, platform scale, Alfred Bonsfield, filed April 30, 1927.

The principal object of the present invention is to provide an improved pinion assembly, the construction being such that during the weighing operation the pinion is actuated independently of the indicator which is normally locked and, upon the tripping of the locking means, the indicator is moved to a position determined by a stop on the pinion, the pinion also performing the function of restoring the indicator to its zero position when the object being weighed is removed from the scale platform.

Another object of this invention is the provision of an improved locking mechanism whereby during the weighing operation it becomes independent of the counter-balancing means, this feature of construction being for the purpose of precluding the locking mechanism from interfering with the weighing operation whereby greater accuracy is obtained.

Still another object of this invention is the provision of certain improvements in coin-controlled weighing machines whereby certain fraudulent usages of the same, such as "double weighing", are prevented.

Other objects of this invention, together with certain details of construction and combination of parts, will be more particularly described by reference to the accompanying drawings and pointed out in the appended claims.

In the accompanying drawings:

Figure 2 is a cross-sectional view of the head mechanism taken substantially on line 2—2 in Figure 1;

Figure 3 is a cross-sectional view of the pinion organization as assembled on the indicator shaft; and Figure 4 is a detail view of the locking mechanism showing the locking pawl engaging the ratchet wheel when the indicator is at the zero indication on the scale chart.

Similar characters of reference indicate corresponding parts throughout the several views.

Figure 1:
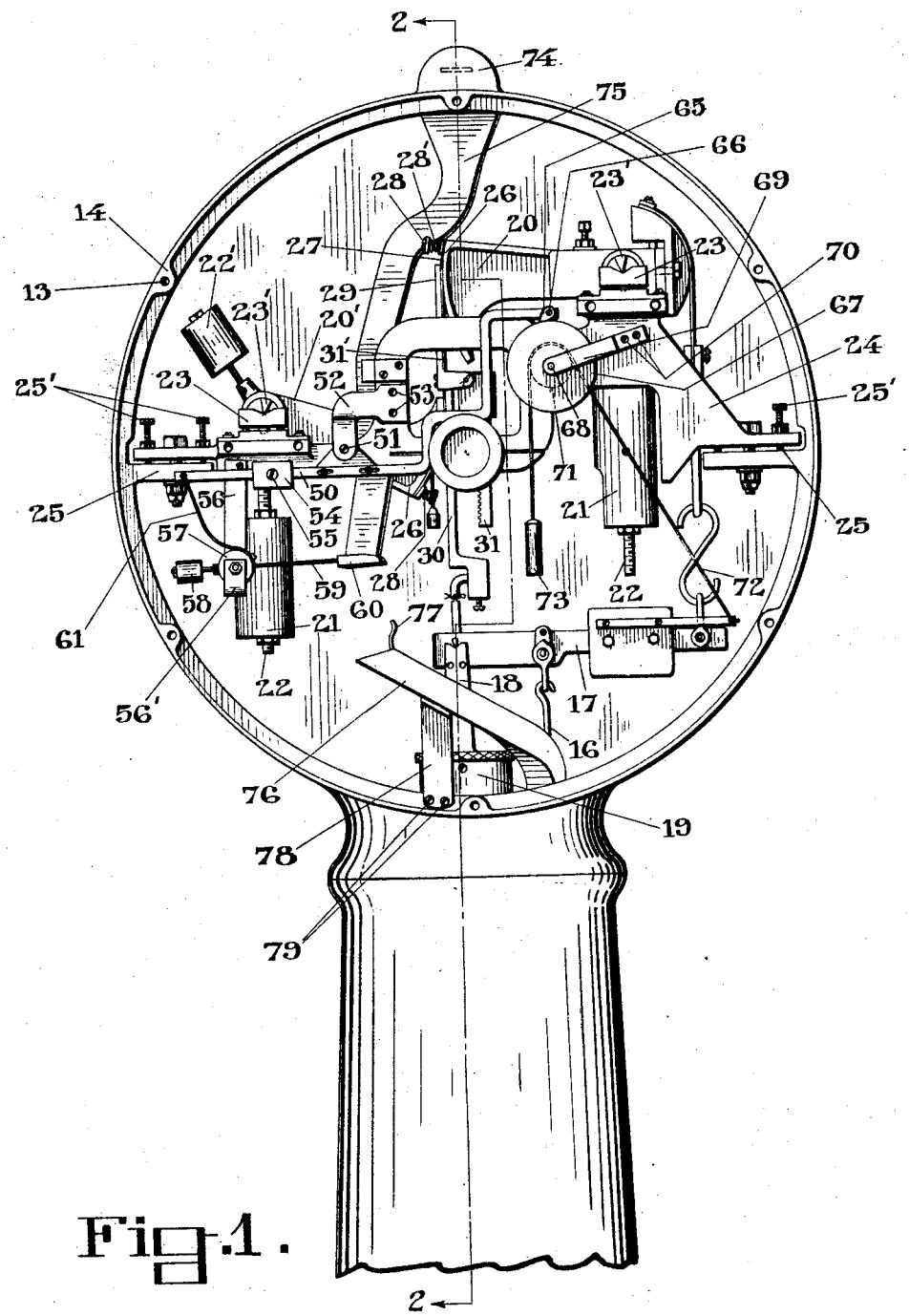
Figure 1 is a detail view of the head mechanism of the coin-controlled scale, the rear panel being removed.

In the drawings wherein the preferred embodiment of the invention is shown, the weighing machine comprises a base 1, in which are disposed the platform levers (not shown), a hollow vertical column 2 rising from the rear portion of the base, being suitably attached thereto, and a hollow drum-shaped head 3 having a collar 4 cast integral therewith. The collar has a flanged portion 5 which rests on a flanged portion 6 formed on the upper extremity of the column, the flanges being rigidly fastened to each other by any suitable means. The head 3 is suitably enclosed in the rear by a panel 7 and the front thereof by a dial plate or chart 8. The dial plate and an indicator 9 adapted to move thereover are, as customary, protected by a covering of glass 10, which is held in position by means of an annular frame 11 attached to the head 3 by any suitable means, but preferably by screws 12 passing through the frame and entering screw-threaded apertures 13 formed in ears 14 cast integral with the head 3.

The weighing platform which is adapted to receive the object to be weighed is suitably supported on the platform levers, which are not shown. The force exerted upon the platform by the load is transmitted through the platform levers to the load counterbalancing means through the medium of a steelyard rod 16, which is connected at its lower end to the nose iron of the platform lever system, as is well understood in the art, and at its upper end to a shelf lever 17 having knife edge pivots 17′ fulcrumed on a pair of uprights 18 cast integral with a cover 18′ of a dashpot 19.

The counterbalancing means (Fig. 1) comprises a pendulum arm 20 and an auxiliary pendulum arm 20' having pendulum weights 21 mounted for vertical adjustment on threaded stems 22 depending from the pendulum arms. The auxiliary pendulum arm also carries an adjustable balance weight 22'. Compensating bearings 23 are seated on a frame 24 and are adapted to pivotally support the knife edge pivots 23' of the pendulum arms. The axes of the pivots are arranged to lie in parallel planes and to maintain their parallelism, as is fully set forth in my copending applications, above identified.

The frame is preferably adjustably supported on shelves 25, which are cast integral with the head 3, the adjustments being accomplished by means of screws 25' cooperating with the shelves. A segment 26 is formed on the inner extremity of each pendulum arm, the segments being connected by means of a flexible tape, or ribbon 27, which is fastened to the segments by any suitable means, as by studs 28 and springs 28'. To this tape are secured an upper guide member 29 and a lower guide member 30, said guide members being adapted to reciprocate vertically in a straight line when actuated by a load being placed upon the scale platform and to transmit a similar motion to a rack-bar 31, (Fig. 2) which is pivotally mounted in a clevis 31' integral with the upper guide member 29.

The rack-bar 31 meshes with a pinion 32, (Fig. 3) mounted on an enlarged center shaft 33 on the reduced laterally extended portions 33a of which are mounted ball-bearing containers 34, in which are set the ball races 35. The pinion and mounting thereof is loose or, in other words, floatingly mounted on the center shaft 33 forming with the extended portions 33a integral parts of the elongated shaft 36. The elongated shaft 36 is journaled in ball races 37, which are mounted in containers 38 held in frame 24. A sleeve 38' telescopes the shaft 36 and acts as a spacing element. A stop 39, the purpose of which will hereinafter be set forth, is fixed to the pinion assembly.

A ratchet wheel 40 is attached to shaft 36 and is adapted to rotate therewith, the wheel having an integral hub 41. A dowel pin 42 passes through the hub portion and the shaft 36 and is adapted to fix the ratchet wheel in position on the shaft. The dowel pin is extended to form a stop, which is arranged to cooperate with the stop 39 on the pinion assembly.

On the inner extremity of the shaft 36 (Figs. 2 and 3) is mounted a wheel 43, which is retained in position on the shaft by means of set screw 44. One end of a chain 45 is fixed to the wheel 43 and on the other end is hung a weight 46. An annular groove 47 is formed in the periphery of the wheel for guiding and retaining the windings of the chain during a weighing operation. Normally, or when the indicator is at the zero indication, the chain is almost completely wound on the wheel, as is shown in Figure 1. An indicator hub 48 on which is mounted the indicator 9 is fixed to the outer end of the shaft 36 preferably by a set screw 49.

The locking mechanism (Figs. 1 and 4) comprising a trip arm 50 pivotally attached at 51 to a bracket 52, which is fastened to frame 24 by rivets 53. The trip arm is balanced by a balance weight 54 adjustable along the arm, being retained in its adjusted position by a set screw 55. Suitably attached to the frame and depending therefrom is a bracket 56 which is bent to form a U-shaped portion 56' in which is pivotally mounted a drum 57. An adjustable balance weight 58 is attached to the drum on one side thereof and a rod 59 carrying a coin pan 60 is mounted on the other side. The balance weight 58 is arranged to normally hold the rod 59 and the coin pan in an elevated position for receiving the coin of the scale user. The drum is connected to one end of the trip arm by means of a chain 61.

A locking pawl 62 (Fig. 4) is fixed to the trip arm by means of screws 63 and is adapted to engage the teeth of the ratchet wheel and a pin 64 projecting radially from the ratchet wheel. The pawl 62 and the pin 64 are in abutting relation when the scale parts are in normal position, that is, when the indicator points to the zero mark on the chart.

The locking mechanism (Figs. 1 and 4) is tripped when the coin reaches the coin pan 60. The weight and impact of the coin causes the pan to descend thereby revolving the drum which, through the medium of the chain 61, exerts a pull on the trip arm 50 causing the latter to rotate about its fulcrum point 51 thus lifting the locking pawl 62 away from the ratchet wheel 40 and the stop 64. Upon the coin leaving the pan, the trip arm, by virtue of its construction, tends to return to its normal position but is prevented by a heart-shaped cam 65 (Fig. 1) pivotally mounted at 66 on the end of the trip arm cooperating with a tripping wheel 67, against the periphery of which the apex of the cam impinges. Normally, that is when the scale is locked, the cam 65 rests on its side against the tripping wheel 67 which is mounted for rotation on a shaft 68 journaled in a bracket 69 attached to frame 24 by means of rivets 70. In unlocked, or operative, position the apex of the cam rests on the peripheral surface of the tripping wheel 67, the construction being such that the apex of the cam and the axes of the tripping wheel 67 and the cam pivot designated by the reference character 66 lie in the same vertical plane. Integral with the tripping wheel 67 there is mounted a hub 71 having a peripheral groove. A chain 72 is trained over the hub, the chain being connected at one end to the shelf lever 17. On the other end of the chain is carried a weight 73.

Any suitable means may be employed for conducting the coin from the coin slot 74 to the coin pan 60 and from the pan to the coin chest, which is preferably located in the hollow column. In the embodiment disclosed, the coin conducting means comprises an upper coin chute 75 extending from the coin slot to the normal position of the pan 60 and a lower coin chute 76 having a guard member 77. The lower chute is supported by a bracket 78 attached by means of rivets 79 to the head 3. The chute 76 extends from the lowermost point in the travel of the pan 60 to the head of the column 2.

The dashpot 19 which is adapted to dampen the oscillations of the scale parts extends partially into the column 2 through the apertured coverplate 80, the dashpot being fixed to the coverplate by means of screws 81 passing through the flange 82 integral with the dashpot. The stem 83 of the plunger 84 passes through the aperture 85 in the dashpot cover and an opening 86 in the shelf lever 17 and is suitably connected to the lower guide member 30.

The operation of the weighing device is as follows: Upon a weight being applied to the scale platform the load is offset by the counterbalancing elements. The movement of the pendulums 20 and 21 or counterbalancing elements 21 (Fig. 1), to offset the load on the platform pulls the rack-bar 31 vertically upward and causes the pinion 32 with which the rack-bar meshes to rotate to a predetermined position, the indicator 9 and indicator shaft 36 remaining stationary, being locked in position by the engagement of the pawl 62 with the ratchet wheel 40 and the stop 64 (Fig. 4).

In order to ascertain the weight of the load on the platform a coin must be inserted in the slot. The coin drops through the upper chute into pan 60 thus tripping the locking mechanism and allowing the weight 46 to cause the rotation of the wheel 43 (Figs. 2 and 3), the indicator shaft 36 and indicator 9 in a clockwise direction until the stop on the hub of the ratchet wheel 40 engages the previously shifted stop on the pinion 32.

The indicator 9 is thus brought to rest and designates in cooperation with the chart, the weight of the load upon the platform.

When the platform is relieved of its load, the shelf lever 17 is moved, which movement is transmitted to the tripping wheel 67 through the medium of chain 72 whereby the cam 65 is caused to fall on its side thus allowing the locking mechanism to become operative. As the counterbalancing means assume their normal position, the rack-bar 31 (Figs. 2 and 3) is carried downwardly thereby thus causing the pinion 32 to rotate. The stop on the pinion being in engagement with the stop on the hub of the ratchet wheel 40 imparts the counterclockwise rotation of the pinion 32 to the wheel 43 and the indicator 9, the chain 45 being wound upon the wheel 43.

The return movement of the shaft 36 and the elements fixed thereto is limited by the stop 64 on the ratchet wheel 40 which, upon contacting with the pawl 62, locks the latter and the ratchet wheel 40 together, the indicator 9 pointing to the zero indication on the chart.

Having thus described my invention, what I claim as new and desire to secure by Letters Patent of the United States, is:

1. In a device of the character described, the combination with a weighing mechanism and an indicator assembly including an indicator shaft, actuating means for the said shaft, a ratchet wheel fixed to said shaft and having a radially extending pin thereon, a locking mechanism comprising a pivotally mounted trip arm carrying a locking pawl substantially intermediate the ends of the said trip arm and adapted to engage the said ratchet wheel and radial pin thereon, and coin-actuated means for temporarily holding the said trip arm and the coin pan in their inoperative position upon a coin leaving the pan comprising a heart-shaped cam pivotally mounted on the upper end of the said trip arm having its side co-operating with the periphery of a tripping wheel when the locking mechanism is in its operative position and its apex resting in engagement with the periphery of the said tripping wheel when the locking mechanism is temporarily released, the said weighing mechanism comprising co-operating pivoted levers including a shelf lever, and means for operating the said tripping wheel under control of the shelf lever of the weighing mechanism, whereby the tripping wheel is turned and the cam caused to move into its operative position and thus permit the arm to drop and the locking pawl to engage the said ratchet wheel and radial pin and thus lock the said indicator assembly.

2. In a device of the character described, the combination with a weighing mechanism and an indicator assembly including an indicator shaft, actuating means for the said shaft, a ratchet wheel fixed to said shaft and having a radially extending pin thereon, a locking mechanism comprising a pivotally mounted trip arm carrying a locking pawl substantially intermediate the ends of the said trip arm and adapted to engage the said ratchet wheel and radial pin thereon, coin-actuated means for temporarily holding the said trip arm and coin pan in their inoperative position upon a coin leaving the pan comprising a heart-shaped cam pivotally mounted on the upper end of the said trip arm having its side co-operating with the periphery of a tripping wheel when the locking mechanism is in its operative position and its apex resting in engagement with the periphery of the said tripping wheel when the locking mechanism is temporarily released, a hub on the said tripping wheel, a shelf lever connected to the steelyard rod of the said weighing mechanism, and a chain passing over the said hub and provided on its free end with a weight and having its fixed end connected to the said shelf lever, whereby the movement of the said shelf lever is adapted to cause the said chain to turn the tripping wheel and cause the said cam to fall on its side and permit the locking mechanism to become operative.

3. In a device of the character described, the combination with a weighing mechanism, of an indicator assembly including an indicator mounted on an indicator shaft, a pinion member having a stop thereon and loosely mounted on said shaft, a ratchet wheel fixed to said shaft, a pin carried by said ratchet wheel, a locking pawl normally engaging said ratchet wheel, and coin-actuated means for temporarily releasing said pawl including a pivoted tripping member having mounted at its free end a movable cam co-operating with rotatable means actuated by the said weighing mechanism, said stop and pin co-operating to determine the position of said indicator during a weighing operation.

4. In a device of the character described, the combination with a weighing mechanism, of an indicator assembly including an indicator mounted on an indicator shaft, a pinion member having a stop thereon and loosely mounted on said shaft, an actuating member meshing with said pinion member, a ratchet wheel having a pin thereon and fixed to said shaft and movable thereon, locking means normally in engagement with said ratchet wheel for locking said indicator shaft and indicator, and coin-actuated means for temporarily releasing said locking means including a pivoted tripping member having mounted at its free end a movable cam co-operating with rotatable means actuated by the said weighing mechanism, said pinion actuating member being adapted to move said pinion member and stop when said stop is released from said locking means.

5. In a device of the character described, the combination with a weighing mechanism, of an indicator assembly including an indicator mounted on an indicator shaft, a pinion member having a stop thereon and loosely mounted on said shaft, an actuating member meshing with said pinion member, a ratchet wheel having a pin thereon and fixed to said shaft, a pawl co-operating with said ratchet wheel for locking the wheel against rotation, and coin-actuated means for temporarily releasing said locking means including a pivoted tripping member having mounted at its free end a movable cam co-operating with rotatable means actuated by the said weighing mechanism, said pinion actuating means being adapted to rotate said pinion member to a predetermined position for co-operation with said pin when said ratchet wheel is released.

6. In a device of the character described, the combination with a weighing mechanism, of an indicator assembly including an indicator mounted on an indicator shaft, a pinion member having a stop thereon and loosely mounted on said shaft, an actuating member meshing with said pinion member, a ratchet wheel having a pin thereon and fixed to said shaft, locking means for locking said indicator shaft and indicator, coin-actuated means for temporarily releasing said locking means including a pivoted tripping member having mounted at its free end a movable cam co-operating with rotatable means actuated by the said weighing mechanism, said pinion actuating means being adapted to move said pinion stop to a predetermined position, and means independent of said pinion for moving said indicator to a position determined by said pinion stop.

7. In a device of the character described, the combination with a weighing mechanism, of an indicator assembly including an indicator mounted on an indicator shaft, a pinion member having a stop thereon and loosely mounted on said shaft, an actuating member meshing with said pinion member, a ratchet wheel having a pin thereon and fixed to said shaft, a pawl co-operating with said ratchet wheel for locking the wheel against rotation, and coin-actuated means for temporarily releasing said ratchet wheel including a pivoted tripping member having mounted at its free end a movable cam co-operating with rotatable means actuated by the said weighing mechanism, said pinion actuating means being adapted to move the pinion stop to a predetermined position for co-operation with said pin and said ratchet wheel during a weighing operation and to return said pinion and ratchet wheel to normal position after the weighing operation.

In witness whereof I have hereunto set my hand this 28th day of December, 1927.

HARLAN A. HADLEY.